3,022,296
SYNTHESIS OF STEROIDS
Josef Fried and Josef E. Herz, New Brunswick, N.J., assignors to Olin Mathieson Chemical Corporation, New York, N.Y., a corporation of Virginia
No Drawing. Original application Apr. 2, 1956, Ser. No. 575,344, now Patent No. 2,920,084, dated Jan. 5, 1960. Divided and this application May 20, 1959, Ser. No. 817,703
2 Claims. (Cl. 260—239.55)

This application is a division of our application, Serial No. 575,344, filed April 2, 156, now Patent No. 2,920,084, which in turn is a continuation-in-part of our parent applications, Serial No. 434,672, filed June 4, 1954, now Patent No. 2,763,671, and Serial No. 483,166, filed January 20, 1955.

This invention relates to the synthesis of valuable steroids; and has for its objects the provision of an advantageous process of preparing steroids of the pregnene (including pregnene, allopregnene, pregnadiene, and pregnatriene) series having a 21-aldo or acetalized aldo group, a 9α-halo group, and an 11β-hydroxy or 11-keto group; and of certain new steroids useful in the preparation of said steroids.

The process of this invention essentially comprises: (a) converting a 21-alkanesulfonyloxy-9β,11β-epoxy steroid of the pregnane series to the corresponding 21-bromo or chloro derivative thereof: (b) converting said 21-bromo or chloro derivative to the corresponding 21-quaternary ammonium salt; (c) converting said 21-quaternary ammonium salt to the corresponding 21-nitrone derivative; and (d) converting the 21-nitrone to the corresponding 21-aldehyde or 21-acetal derivative.

The new compounds of this invention comprise: (A) 21-bromo or chloro-9β, 11β-epoxy steroids of the pregnene series; (B) 21-bromo or chloro-9α-halo-11β-hydroxy or 11-keto steroids of the pregnene series; (C) 21-quaternary ammonium-9α-halo-11β-hydroxy or 11-keto steroids of the pregnene series; and (D) 21-nitrone-9α-halo-11β-hydroxy or keto steroids of the pregnene series.

For a clearer understanding of the foregoing general and following detailed description of the processes of this invention, reference is made to the following schematic analysis:

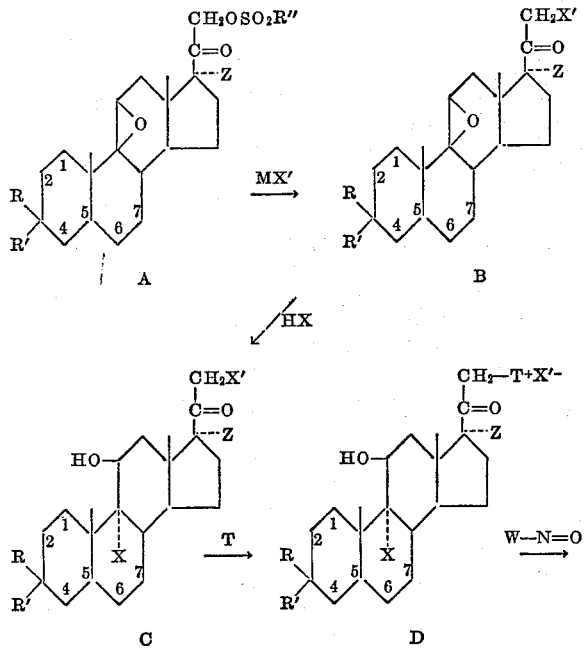

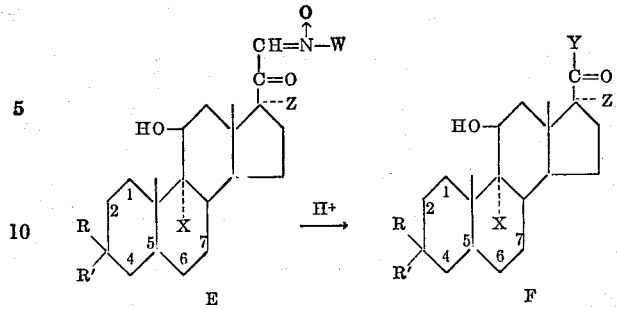

wherein at least one of the positions 1,2; 4,5; and 6,7 is double-bonded (those wherein the 1,2 and 6,7-positions are saturated and the 4,5-position is double-bonded being preferred), and wherein R is hydrogen, R' is hydroxy, or together R and R' is oxo (keto) or ketalized keto (it being understood that when R and R' is a ketal group, the double bond, if any, in the 4,5-position shifts to the 5,6-position), R and R' as oxo being preferred; Z is hydrogen or preferably α-hydroxy; R'' is an alkyl radical, particularly a lower alkyl such as methyl, ethyl, hexyl, etc. and is preferably methyl; X' is chloro or bromo; X is halo (i.e. iodo, bromo, chloro or fluoro, and preferably is chloro or fluoro); M is a metal, such as an alkali metal or an alkaline earth metal, the halogen salt of which is soluble in the solvent employed in the indicated reaction, and preferably is alkali metal, such as potassium or lithium; T is a tertiary amine; W is an aromatic radical; and Y is CHO, $CH(OH)_2$, $CH(OB)_2$ or

wherein B is lower alkyl or benzyl and B' is lower alkylene.

The preparation of compounds suitable as initial reactants in the process of this invention is disclosed in our application, Serial No. 521,915, filed July 13, 1955. These compounds include the 21-alkane-sulfonyl, particularly the 21-(lower alkane) sulfonyl, as exemplified by ethanesulfonyl, propanesulfonyl, hexanesulfonyl and especially methanesulfonyl, derivatives of the following: $\Delta^4$ - pregene-9β,11β-oxido-21-ol-3,20-dione; $\Delta^4$-pregnene-9β,11β-oxido-17α,21-diol-3,20-dione; $\Delta^{1,4}$-pregnadiene-9β,11β - oxido - 21-ol-3,20-dione; $\Delta^{1,4}$-pregnadiene-9β,11β-oxido - 17α,21-diol-3,20-dione; $\Delta^{4,6}$-pregnadiene-9β,11β-oxido-21-ol-3,20-dione; and $\Delta^{4,6}$-pregnadiene-9β,11β-oxido-17α,21-diol-3,20-dione. As disclosed in said application, these starting materials are prepared by reacting the corresponding 21-free ol steroid with an alkanesulfonyl halide under substantially anhydrous conditions.

These starting materials, compounds A, are the reacted with a metal chloride or bromide (MX'), wherein MX' is as above-defined. Particularly preferred metal halides are lithium chloride and lithium bromide. Other utilizable salts include beryllium chloride, calcium chloride, potassium bromide, calcium bromide and barium bromide. The reaction is preferably carried out at elevated temperature in a substantially anhydrous organic solvent wherein the metal halide is soluble. Such solvents include the lower alkanolic acids (particularly glacial acetic acid), ketones (particularly acetone) and lower allkanols. If the reaction is conducted in a neutral solvent such as acetone, the product formed is the corresponding 9β,11β-epoxy-21-halide, compounds B (wherein the halide corresponds to the halogen of the metal halide reactant). If, however, an acidic solvent, such as glacial acetic acid, is used, then the epoxy ring is opened to directly yield the corresponding 11β - hydroxy-9β,21-dihalide derivative, compounds C, wherein the halo substituents correspond to the halogen of the metal halide reactant.

Compunds B are then reacted with a hydrogen halide (i.e. hydrofluoric, hydrochloric, hydrobromic, or hydroiodic acid) in a suitable solvent (e.g. chloroform), as disclosed in the application of Josef Fried, Serial No. 417,489, filed March 10, 1954. By this reaction, compounds C are formed having a 9α-halo and 11β-hydroxy radical and a 21-halo substituent corresponding to the substituent in compound B. The 11β-hydroxy group present in compounds C or the corresponding 11β-hydroxy group present in compounds D, E, and F, can, if desired, be oxidized to the corresponding keto group in the usual manner, as by treating the steroid with chromic acid in glacial acetic acid. Thus, the first class of novel intermediates of this invention may be represented by the general formula

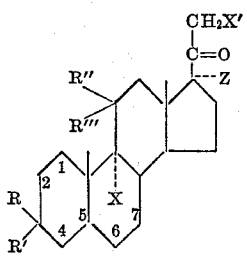

wherein at least one of the positions 1,2; 4,5; and 6,7 is double-bonded (preferably the 1,2 and 6,7 positions are saturated and the 4,5-position is double-bonded), R″ is hydrogen, R‴ is β-hydroxy, or together R″ and R‴ is keto, and R, R′, X, X′, and Z are as hereinbefore defined.

These compounds may also be prepared directly from the corresponding 21-alkanesulfonyloxy derivatives (steroids which are disclosed in our application, Serial No. 516,333, filed June 17, 1955) by reaction thereof with the metal halide, MX′, wherein MX′ is as hereinbefore defined, under substantially anhydrous conditions, preferably at an elevated temperature in the presence of an organic solvent for the metal halide (e.g. glacial acetic acid or acetone).

Compounds C can then be converted to compounds D by reacting with a tertiary base (T) at an elevated temperature. Among the tertiary bases which can be mentioned as examples are the aromatic amines (e.g. pyridine, picolines, lutidines, and quinolines). The resulting quaternary ammonium salts may be represented by the following general formula

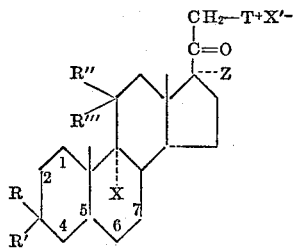

wherein one of the positions 1,2; 4,5; and 6,7 is double-bonded (preferably the 4,5-position is double-bonded and the 1,2 and 6,7 positions are saturated), T represents the tertiary amine, and R, R′, R″, R‴, X, X′, and Z are as hereinbefore defined.

These 21-quaternary ammonium steroids can also be prepared directly from the corresponding 21-alkanesulfonyloxy derivatives disclosed in said application, Serial No. 516,333, by reacting the 21-alkanesulfonyloxy steroid with the tertiary amine under substantially anhydrous conditions, preferably at elevated temperature (e.g. the reflux temperature of the amine).

In the next step of the process of this invention, the quaternary ammonium halide, compounds D, are reacted with a nitroso compound, preferably an aromatic nitroso compound (WN=O), such as nitroso benzene and p-nitroso-dimethylaniline, in the presence of a basic reagent such as potassium bicarbonate. By this procedure, a 21-nitrone, compound E, is formed. These nitrones are exemplified by those of the following general formula

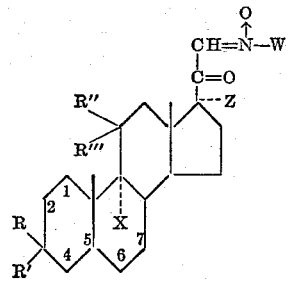

wherein one of the positions 1,2; 4,5; and 6,7 is double-bonded (preferably the 4,5 position is double-bonded) and the 1,2 and 6,7 positions are saturated, R, R′, R″, R‴, Z, and X are as hereinbefore-defined, and W is an aromatic radical such as phenyl and p-dimethylamino phenyl.

To convert the 21-nitrones, compounds E, to an acetal derivative of a 21-aldehyde, the former is then reacted, according to the process of this invention, under anhydrous conditions in an acidic medium with either a monohydric alcohol of the formula EOH or a dihydric alcohol of the formula B′(OH)$_2$, wherein B and B′ are as above-defined, preferably with an alcohol of the formula BOH, wherein B is a lower alkyl (e.g. methyl, ethyl, n-propyl, or n-butyl) or benzyl radical. The reaction is preferably carried out by dissolving or suspending the starting material in an anhydrous organic solvent, such as chloroform, acetone, dioxane, etc., and treating the solution with a mineral acid such as hydrogen chloride or a strong organic acid, such as trichloroacetic acid or p-toluene sulfonic acid, dissolved in the alcohol reactant. The ratio of alcohol to steroid for the reaction is preferably at least two equivalents of alcohol (i.e. two moles of an alcohol BOH or one mole of an alcohol B′(OH)$_2$) per mole of steroid. If the alcohol reactant is a lower alcohol, the nitrone can be suspended directly in the mineral acid-alcohol solution, thereby eliminating the organic solvent. The reaction proceeds readily at room temperature, but may be conducted at any temperature in the range of about 25° C. to about 100° C.

The acetal derivative formed by this step of the process of this invention may then be converted to the corresponding free aldehyde by reacting the acetal with an aqueous mineral acid, such as hydrochloric acid or perchloric acid, in mixture with an organic solvent, such as acetic acid, dioxane, acetone, etc., preferably at room temperature.

The free aldehydes can also be prepared directly from the nitrones by reacting the latter with the aforementioned mineral acids or strong organic acids, in an inert organic solvent such as acetone, acetic acid, dioxane, etc., preferably at room temperature. These free aldehydes can then in turn be converted to either the acetalized derivatives by treatment with an alcohol, such as those of the formula BOH and B′(OH)$_2$, under acidic conditions, or the diesterified derivatives by treatment, in an organic base (e.g. pyridine), with an anhydride, such as those of the formula

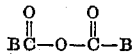

wherein B is as hereinbefore-defined, as exemplified by acetic anhydride.

A modification of the process of this invention consists of the direct oxidation of an acetal derivative of a 21-aldo steroid having an 11β-hydroxy group to the corresponding acetal derivative having an 11-keto group. Thus, to form a 21-aldo steroid having an 11-keto group, instead of starting with the corresponding steroid having an 11-keto group and converting this 11-keto steroid to acetal derivative and thence to the free aldehyde, the 11β-hydroxy derivative (R″ is hydrogen, R‴ is β-hydroxy) is chosen as the initial reactant, and this reactant is converted to the 21-acetal derivative. The acetal derivative is then reacted with a customary oxidizing agent, such as chromic oxide in a basic medium such as pyridine, to oxidize the 11β-hydroxy group to keto, and the 11-keto 21-acetal derivative thus formed is then converted to the free 21-aldehyde.

For the purpose of illustrating one process of this invention, reference is made to the following schematic analysis employing Δ⁴-pregnane-9β,11β-oxids-17α,21-diol-3,20-dione 21-mesylate as starting material:

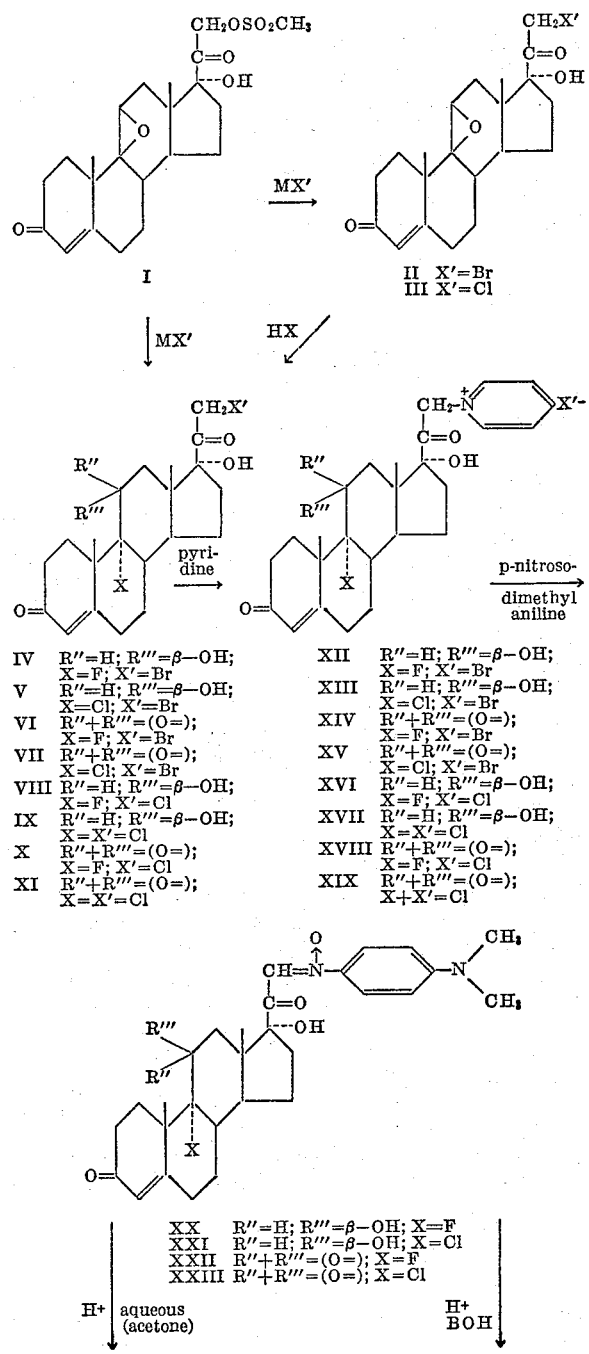

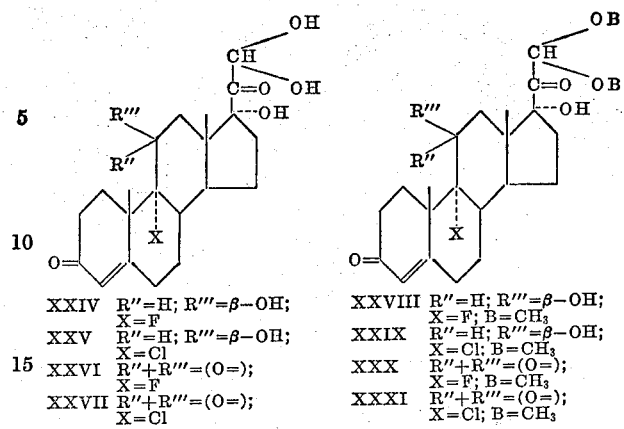

The acetal derivatives and the free aldehydes which represent the final products of the processes of this invention are active materials which possess glucocorticoid as well as mineralocorticoid activity. Thus, they can be administered instead of, and in the same manner as, cortisone or hydrocortisone in the treatment of rheumatoid arthritis and dermatomyositis, and desoxycorticosterone in the treatment of Addison's disease or adrenal insufficiencies. The dosage for such administration is of course dependent on the relative activity; thus, where the acetal derivative, for example, has activity of the same order as hydrocortisone, for example, the dosage is of the same order.

The following examples are illustrative of the invention (all temperatures being in centigrade):

EXAMPLE 1

*21-bromo-Δ⁴-pregnene-9β,11β-oxido-17α-ol-3,20-dione*

A solution of 100 mg. of Δ⁴-pregnene-9β,11β-oxido-17α,21-diol-3,20-dione 21-mesylate (I) and 300 mg. of anhydrous lithium bromide in 5 ml. of acetone is refluxed for ½ hour. After removal of the acetone in vacuo the residue is taken up in water and chloroform and the resulting chloroform extract washed with dilute sodium bicarbonate solution and water. After drying over sodium sulfate the chloroform solution is evaporated to dryness in vacuo and the resulting crystalline residue recrystallized from acetone. Pure 21-bromo-Δ⁴-pregnene-9β,11β-oxido-17α-ol-3,20-dione has the following properties: M.P. 193° (dec.); $[\alpha]_D^{23} + 18°$ (c, 0.71 in CHCl₃);

$\lambda_{max.}^{alc.}$ 243 mμ (ε=16,200); $\lambda_{max.}^{Nujol}$ 2.88μ, 5.75μ, 6.06μ, 6.15μ

*Analysis.*—Calcd. for C₂₁H₂₇O₄Br (423.33); C, 59.58; H, 6.42. Found: C, 59.56; H, 6.74.

EXAMPLE 2

*21-chloro-Δ⁴-pregnene-9β,11β-oxido-17α-ol-3,20-dione (III)*

A suspension of Δ⁴-pregnene-9β,11β-oxido-17α,21-diol-3,20-dione 21-mesylate (I) and 300 mg. of lithium chloride in 6 ml. of acetone is refluxed for 2 hours. After removal of the solvent in vacuo the residue is distributed between water and chloroform. The chloroform solution is dried over sodium sulfate and concentrated to dryness in vacuo. The crystalline residue consisting of 21-chloro-Δ⁴-pregnene-9β,11β-oxido-17α-ol-3,20-dione after recrystallization from acetone has the following properties, M.P. about 235–236° (dec.); $[\alpha]_D^{22} + 28°$ (c, 0.39 in dioxane);

$\lambda_{max.}^{alc.}$ 243 mμ (ε=16,200); $\lambda_{max.}^{Nujol}$ 2.87μ (OH); 5.78μ (20-keto); 6.08μ, 6.14μ (Δ⁴-3-ketone)

*Analysis.*—Calcd. for C₂₁H₂₇O₄Cl (379): C, 66.58; H, 7.18. Found: C, 67.01; H, 7.09.

The epoxides formed by the procedures of Examples 1 and 2 can then be converted to the corresponding 9α-halo-11β-hydroxy derivatives as illustrated in the following two examples:

EXAMPLE 3

*21-bromo-9α-chloro-Δ⁴-pregnene-11β,17α-diol-3,20-dione (V)*

To a solution of 42 mg. of 21-bromo-Δ⁴-pregnene-9β,11β-oxido-17α-ol-3,20-dione in 8.4 ml. of alcohol-free chloroform is added, at 0°, 1.8 ml. of 0.5 N hydrochloric acid in chloroform. After 60 minutes, ice and dilute bicarbonate are added to wash out excess acid; and after separation of the layers, the chloroform solution is washed with water, dried over sodium sulfate and evaporated to dryness. The crystalline residue is recrystallized twice from acetone to give pure 21-bromo-9α-chloro-Δ⁴-pregnene-11β,17α-diol-3,20-dione.

If hydrofluoric acid is substituted for the hydrochloric acid in the procedure of Example 3, 21-bromo-9α-fluoro-Δ⁴-pregnene-11β,17α-diol-3,20-dione (IV) is formed.

EXAMPLE 4

*21-chloro-9α-fluoro-Δ⁴-pregnene-11β,17α-diol-3,20-dione (VIII)*

Anhydrous hydrogen fluoride is added to a solution of 66 mg. of 21-chloro-Δ⁴-pregnene-9β,11β-oxide-17α-ol-3,20-dione in 9.5 ml. of chloroform and 0.5 ml. of alcohol (contained in a polyethylene vessel provided with a copper inlet tube). During the addition, the solution is maintained in an ice bath and agitated by magnetic stirring, until the solution assumes a prominent red color. The inlet tube is then replaced by a polyethylene cap, and the reaction allowed to proceed with stirring for 1.5 hours at 0°. Concentrated aqueous sodium bicarbonate solution is then added until the mixture is slightly alkaline, and the two layers are separated. The now light-yellow chloroform solution is washed with water; and after drying over sodium sulfate, it is evaporated to dryness in vacuo. The residue is then taken up in hot ethyl acetate, the resulting suspension filtered, and the filtrate, on cooling, deposits a crystalline precipitate. This material is essentially pure 21-chloro-9α-fluoro-Δ⁴-pregnene-11β,17α-diol-3,20-dione which is recrystallized from ethyl acetate to give a pure product having the properties described in Example 7.

If hydrochloric acid is substituted for the hydrofluoric acid in the procedure of Example 4, 9α,21-dichloro-Δ⁴-pregnene-11β,17α-diol-3,20-dione (IX) is formed.

Similarly if hydrobromic or hydroiodic acid is substituted for the hydrochloric or hydrofluoric acid in the procedures of Examples 3 and 4, the corresponding 9α-bromo and 9α-iodo derivatives are formed.

9α,21-dichloro-Δ⁴-pregnene-11β,17α - diol - 3,20 - dione (IX) can also be prepared directly from Δ⁴-pregnene-9β,11β-oxido-17α,21-diol-3,20-dione 21 mesylate (I) as disclosed in the following example:

EXAMPLE 5

*9α,21-dichloro-Δ⁴-pregnene-11β,17α-diol-3,20-dione (IX)*

A solution of 100 mg. of Δ⁴-pregnene-9β,11β-oxido-17α,21-diol-3,20-dione 21-mesylate (I) and 300 mg. of lithium chloride in 6 ml. of glacial acetic acid is heated on the steam bath for 30 minutes. After removal of the solvent in vacuo the residue is taken up in ethyl acetate and water. The ethyl acetate layer is extracted with dilute sodium bicarbonate solution and water and dried over sodium sulfate. The solvent is removed in vacuo and the crystalline residue recrystallized from 95% alcohol. Pure 9α,21-dichloro-Δ⁴-11β,17α-diol-3,20-dione has the following properties M.P. about 275–277° (dec.); $[\alpha]_D^{23} + 156°$ (c, 0.39 in dioxane);

$\lambda_{max}^{Nujol}$ 2.89μ, 3.04 (OH); 5.83μ (20-keto); 6.0° (Δ⁴-3-ketone)λ

*Analysis.*—Calcd. for $C_{21}H_{28}O_4Cl_2$ (414.34): C, 60.73; H, 6.79; Cl, 17.07. Found: C, 61.01; H, 6.89; Cl, 17.55.

The 9α-halo, 11β-hydroxy steroids having a 21-bromo or chloro substituent can also be prepared from the corresponding 21-alkanesulfonyloxy derivatives as illustrated by the following examples:

EXAMPLE 6

*9α-fluoro-21-bromo-Δ⁴-pregnene-11β,17α-diol-3,20-dione (IV)*

A solution of 100 mg. of 9α-fluorohydrocortisone 21-mesylate and 160 mg. of lithium bromide in 3 ml. of glacial acetic acid is refluxed for ½ hour. The mixture is concentrated in vacuo to small volume and the residue distributed between water and ethyl acetate. The ethyl acetate layer is washed with dilute sodium bicarbonate solution and with water, and dried over sodium sulfate. Evaporation of the solvent in vacuo leaves the 21-bromo compound as a crystalline residue, which after recrystallization from 95% ethanol has the following properties, M.P. about 252° (dec.); $[\alpha]_D^{23} + 140°$ (c, 0.43 in dioxane);

$\lambda_{max}^{alc.}$ 237 mμ (ε=20,000); $\lambda_{max}^{Nujol}$ 2.88μ, 3.08μ (OH), 5.86μ (20-keto), 6.10μ (Δ⁴-3-ketone)

*Analysis.*—Calcd. for $C_{21}H_{28}O_4FBr$ (443.35): C, 56.89; H, 6.37; Br, 18.26. Found: C, 56.85; H, 6.37; Br, 18.10.

EXAMPLE 7

*9α-fluoro-21-chloro-Δ⁴-pregnene-11β,17α-diol-3,20-dione (VIII)*

A solution of 9α-fluorohydrocortisone 21-mesylate and 200 mg. of anhydrous lithium chloride in 3 ml. of glacial acetic acid are heated under reflux for one hour. The solution is concentrated in vacuo and the residue distributed between water and ethyl acetate. The ethyl acetate layer is washed with dilute bicarbonate solution and with water and dried over sodium sulfate. Evaporation of the solvent in vacuo leaves the 21-chloro compound as a crystalline residue (about 85 mg.), which after recrystallization from 95% ethanol melts at about 267–269° (dec.); $[\alpha]_D^{23} + 153°$ (c, 0.30 in dioxane);

$\lambda_{max}^{alc.}$ 238 mμ (ε=17,700); $\lambda_{max}^{Nujol}$ 2.88μ, 3.03μ (OH), 5.83μ (20-keto), 6.08μ (Δ⁴-3-ketone)

*Analysis.*—Calcd. for $C_{21}H_{28}O_4FCl$ (398.89): C, 63.23; H, 7.08; Cl, 8.89. Found: C, 63.25; H, 7.34; Cl, 8.44.

The reactions of Examples 6 and 7 can also be carried out with acetone as the solvent.

Similarly, by substituting either 9α-chlorohydrocortisone 21-mesylate or 9α-bromohydrocortisone 21-mesylate for the 9α-fluorohydrocortisone 21-mesylate in the procedures of Examples 6 and 7, the corresponding 21-bromo and 21-chloro derivatives are obtained, respectively.

The 9α-halo-11β-hydroxy-21-bromo or chloro steroids produced by the procedures of Examples 3 through 7 can be oxidized to the corresponding 9α-halo-11-keto-21-bromo or chloro derivatives as illustrated by the following example:

EXAMPLE 8

*9α-fluoro-21-chloro-Δ⁴-pregnene-17α-ol-3,11,20-trione (X)*

To a solution of 100 mg. of 9α-fluoro-21-chloro-Δ⁴-pregnene-11β,17α-diol-3,20-dione in 5 ml. of glacial acetic acid is added a solution of 40 mg. of chromic acid in 4 ml. of acetic acid. A half-hour later, 0.05 ml. of methanol is added, and the resulting mixture is concentrated in vacuo. The residue is distributed between chloroform and water, and the resulting chloroform extract is washed with water, sodium bicarbonate solution and again with water. After drying over sodium sulfate and evaporation of the solvent in vacuo, the residue is crystallized from 95% ethanol to give pure 9α-fluoro-21-chloro-Δ⁴-pregnene-17α-ol-3,11,20-trione.

Similarly, by substituting 9α-fluoro-21-bromo-Δ⁴-pregnene-11β,17α-diol-3,20-dione (IV), 9α-chloro-21-bromo-Δ⁴-pregnene-11β,17α-diol-3,20-dione (V), or 9α,21-dichloro-Δ⁴-pregnene-11β,17α-diol-3,20-dione (IX) for the 9α-fluoro-21-chloro-Δ⁴-pregnene-11β,17α-diol-3,20-dione (VIII) in the procedure of Example 8, 9α-fluoro-21-bromo-Δ⁴-pregnene-17α-ol-3,11,20-trione (VI), 9α-chloro-21-bromo-Δ⁴-pregnene-17α-ol-3,11,20-trione (VII), and 9α,21-dichloro-Δ⁴-pregnene-17α-ol-3,11,20-trione (XI) are obtained, respectively.

The 9α-halo-11β-hydroxy (or 11-keto)-21-bromo or chloro steroids formed in the procedures of Examples 3 through 8 can be converted to their 21-pyridinium derivatives as illustrated in the following example:

EXAMPLE 9

*9α-fluoro-Δ⁴-pregene-11β,17α-diol-3,20-dione 21-pyridinium chloride (XVI) from 9α-fluoro-21-chloro-Δ⁴-pregnene-11β,17α-diol-3,20-dione (VIII)*

A solution of 156 mg. of 9α-fluoro-21-chloro-Δ⁴-pregnene-11β,17α-diol-3,20-dione in 3 ml. of dry pyridine is heated on the steam bath for 30 minutes and after cooling 5 ml. of acetone is added. Cooling produced a crop of crystals (about 123 mg.), M.P. 319–321° (dec.), which represent the 21-pyridinium chloride. From the mother liquors about 32 mg. of starting material M.P. 263° (dec.) is recovered.

The 21-pyridinium halides can be prepared directly from the 21-alkanesulfonyloxy derivatives as illustrated by the following two examples:

EXAMPLE 10

*9α-fluoro-11β,17α-dihydroxyprogesterone 21-pyridinium chloride (XVI) from 9α-fluorohydrocortisone 21-mesylate*

A solution of 500 mg. of 9α-fluorohydrocortisone 21-mesylate in 5 ml. of anhydrous pyridine is heated on the steam bath for 30 minutes. To this solution which contained 9α-fluoro-Δ⁴-pregnene 11β,17α-diol-3,20-dione-21-pyridinium mesylate is added after cooling 3 ml. of 2% methanolic hydrogen chloride and shortly thereafter 20 ml. of acetone. Crystallization of 9α-fluoro-Δ⁴-pregnene-11β,17α-diol-3,20-dione 21-pyridinium chloride ensues rapidly and is complete after several hours in the refrigerator.

The resulting crystals are filtered off and washed with acetone. Recrystallization from methanol furnishes the pure 21-pyridinium chloride, M.P. about 320–321° (dec.); $[\alpha]_D^{23}+200°$ (c, 0.22 in methanol);

$$\lambda_{max.}^{alc.} 239 \ m\mu \ (\epsilon=19,600)$$

*Analysis.*—Calcd. for $C_{26}H_{33}O_4NClF$ (477.99): C, 65.33; H, 6.96; Cl, 7.42. Found: C, 65.48; H, 6.82; Cl, 7.37.

Following the procedure of Example 9, by substituting 9α-fluoro-21-bromo-Δ⁴-pregnene-11β,17α-diol-3,20-dione (IV), 9α-chloro-21-bromo-Δ⁴-pregnene-11β,17α-diol-3,20-dione (V), 9α-fluoro-21-bromo-Δ⁴-pregnene-17α-ol-3,11,20-trione (VII), 9α,21-dichloro-Δ⁴-pregnene-11β,17α-diol-3,20-dione (IX), 9α-fluoro-21-chloro-Δ⁴-pregnene-17α-ol-3,11,20-trione (X), and 9α,21-dichloro-Δ⁴-pregnene-17α-3,11,20-trione (XI) for the 9α-fluoro-21-chloro-Δ⁴-pregnene-11β,17α-diol-3,20-dione, there is obtained compounds XII, XIII, XIV, XV, XVII, XVIII, and XIX, respectively.

Compounds XII through XIX can also be prepared directly from the corresponding 9α-halohydrocortisone or 9α-halocortisone by reaction thereof with p-toluenesulfonyl chloride or bromide in anhydrous pyridine at an elevated temperature as illustrated by the following example:

EXAMPLE 11

*9α-chloro-Δ⁴-pregnene-11β,17α-diol-3,20-dione 21-pyridinium chloride (XVII) and 9α,21-dichloro-Δ⁴-pregnene-11β,17α-diol-3,20-dione (IX) from 9α-chlorohydrocortisone*

A solution of 500 mg. of 9α-chlorohydrocortisone and 300 mg. p-toluenesulfonyl chloride in 3 ml. of anhydrous pyridine is heated on the steam bath for 15 minutes. A crystalline precipitate appears which is filtered off and washed with acetone. It represents the desired 21-pyridinium chloride, M.P. about 287° (dec.) and is used without further purification in the nitrone formation reaction. Concentration of the mother liquor afford an additional crop of this substance and then two crops of a lower melting substance, M.P. about 235–237°, which is recrystallized from 95% alcohol. The latter substance represents 9α,21-dichloro-Δ⁴-pregnene-11β,17α-diol-3,20-dione; $[\alpha]_D^{23}+178°$ (c, 0.28 in absolute alcohol);

$\lambda_{max.}^{alc.}$ 241 m$\mu$ ($\epsilon$=16,000); $\lambda_{max.}^{Nujol}$ 2.87$\mu$ (11—OH)3.01$\mu$ (17—OH), 5.83$\mu$ (20-keto), 6.08$\mu$ (3-keto)

*Analysis.*—Calcd. for $C_{21}H_{28}O_4Cl_2$ (415.34): C, 60.72; H, 6.79; Cl, 17.08. Found: C, 60.79; H, 6.70; Cl, 16.66.

If p-toluenesulfonyl bromide is substituted for p-toluenesulfonyl chloride in Example 11, the resulting mixture will consist of the 21-pyridinium bromide (XIII) and the 21-bromide (V). Furthermore, upon the substitution of 9α-chlorocortisone for the 9α-chloro-hydrocortisone, either a mixture of 9α-chloro-Δ⁴-pregnene-17α-ol,3,11,20-trione 21-pyridinium chloride (XIX) and 9α,21-dichloro-Δ⁴-pregnene-17α-ol-3,11,20-trione (XI), or 9α-chloro-Δ⁴-pregnene-17α-ol-3,11,20-trione 21-pyridinium bromide (XV) and 9α-chloro-21-bromo-Δ⁴-pregnene-17α-ol-3,11,20-trione (VII), depending on whether tosyl chloride or tosyl bromide is used, will be formed.

Since the tertiary base is eliminated in the next step of the process, the exact chemical composition of the base is of no importance, so that any other tertiary base may be substituted for pyridine in the processs of the above Examples 9, 10, and 11 to yield other quaternary ammonium salts. Examples of such bases include the lutidines, the collidines, the tri(lower alkyl)amines (e.g. trimethylamine and triethylamine), N-alkylated piperidine, etc.

The formation of the nitrones in the next step of the process of this invention is illustrated by the following examples, using p-nitrosodimethyl aniline as a source of the nitroso reactant:

EXAMPLE 12

*9α-fluoro-Δ⁴-pregnene-11β,17α-diol-3,20-dione 21-(p-dimethylaminophenyl)-nitrone (XX) from 9α-fluoro-Δ⁴-pregnene-11β,17α-diol-3,20-dione 21-pyridinium chloride (XVI)*

To a warm solution of 250 mg. (0.52 millimole) of 9α-fluoro-Δ⁴-pregnene-11β,17α-diol 3,20-dione 21-pyridinium chloride in 7 ml. of methanol and 4.5 ml. water is added 89 mg. (0.58 millimole) of p-nitrosodimethyl aniline and shortly thereafter a solution of 55 mg. of potassium bicarbonate (0.55 millimole) in 0.7 ml. of water. The mixture is gently warmed on a steam bath and then allowed to remain in the refrigerator overnight. The resulting red crystals (about 170 mg.) are filtered off, washed with 1:1 methanol-water and the mother liquors concentrated in vacuo. An additional crop (about 47 mg.) is obtained in this manner. The nitrone is used in the preparation of the aldehyde without further purification. For analysis the unstable nitrone is recrystallized from methanol, M.P. about 226° (dec.);

$\lambda_{max.}^{alc.}$ 240 m$\mu$ ($\epsilon$=25,000), 304 m$\mu$ ($\epsilon$=9,400) and 415 m$\mu$ ($\epsilon$=12,850)

*Analysis.*—Calcd. for $C_{29}H_{37}O_5N_2F$ (512.61): C, 67.94; H, 7.28; N, 5.47. Found: C, 68.87; H, 7.36; N, 6.28.

EXAMPLE 13

*9α-chloro-Δ⁴-pregnene-11β,17α-diol-3,20-dione 21-(p-dimethyl-aminophenyl)-nitrone (XXI) from 9α-chloro-Δ⁴-pregnene-11β,17α-diol-3,20-dione 21-pyridinium chloride (XVII)*

To a warm suspension of 140 mg. of 9α-chloro-Δ⁴-pregnene-11β,17α-diol-3,20-dione 21-pyridinium chloride in 3.8 ml. of methanol and 2.4 ml. water is added 47 mg. of p-nitrosodimethyl aniline. When the latter has dissolved a solution of 30 mg. of potassium bicarbonate in 0.38 ml.

of water is added and the mixture warmed on the steam bath until all the pyridinium salt has dissolved, and has been replaced by the red crystals of the nitrone. The reaction mixture is then cooled and allowed to remain in the refrigerator for one hour. The crystals are filtered and washed with 50% methanol-water and finally with water. The yield of nitrone is about 104 mg., M.P. about 206°. The substance is used in the preparation of the aldehyde without further purification.

In an analogous manner the pyridinium bromides (XII) and (XIII) can be converted to the 9α-fluoro and 9α-chloro derivatives, respectively.

If 9α-fluoro-$\Delta^4$-pregnene-17α-ol-3,11,20-trione 21 pyridinium chloride (XVIII) or bromide (XIV) is substituted for the pyridinium chloride in Example 12, 9α-fluoro-$\Delta^4$-pregnene-17α-ol-3,11,20-trione 21-(p-dimethylaminophenyl)-nitrone (XXII) is formed. Similarly, if 9α-chloro-$\Delta^4$-pregnene-17α-ol-3,11-20-trione 21-pyridinium chloride (XIX) or bromide (XV) is substituted for the pyridinium chloride in Example 13, 9α-chloro-$\Delta^4$-pregnene-17α-ol-3, 11,20-trione 21 - (p - dimethylaminophenyl) - nitrone (XXIII) is produced. Analogously, the quaternary ammonium salts of the corticosterone and dehydrocorticosterone derivatives are converted to the corresponding nitrones.

Although the above examples employ p-nitrosodimethyl aniline as the source of the nitroso radical, any other aromatic nitroso-containing compound (such as nitroso benzene) may be used instead, since in the next step of the process the nitroso group is replaced by an aldo or acetalized aldo substituent.

The nitrone is then converted either to the 21-acetalized aldo or the free 21-aldo as illustrated by the following examples:

EXAMPLE 14

*9α - fluoro - $\Delta^4$ - pregnene - 11β,17α - diol - 3,20 - dione- 21 - al hydrate (XXIV) from 9α - fluoro - $\Delta^4$ - pregnene - 11β,17α - diol - 3,20 - dione 21 - (p-dimethylaminophenyl)-nitrone (XX)*

To a suspension of 120 mg. of 9α-fluoro-$\Delta^4$-pregnene-11β,17α-diol-3,20-dione (21-p-dimethylaminophenyl)-nitrone in 2 ml. of acetone is added at room temperature 1 ml. of 2 N aqueous hydrochloric acid. Gentle agitation causes the nitrone to dissolve rapidly to form a yellow solution. After centrifugation of some insoluble matter 4 ml. of water is added, which causes the aldehyde hydrate to crystallize in fine needles. After one hour at 5° the crystals are separated from the mother liquors and washed thoroughly with water. The resulting crystals (about 81.5 mg.), after recrystallization from acetone-water melt at about 190–191°, $[\alpha]_D^{23}$ —126° (c, 0.48 in methanol);

$\lambda_{max}^{alc.}$ 238 mμ (ε=18,300); $\lambda_{max}^{Nujol}$ 3.0-3.2μ (OH), 5.86μ (20-keto), 6.15μ (4-keto)

*Analysis.*—Calcd. for $C_{21}H_{27}O_5F \cdot H_2O$ (396.44): C, 63.62; H, 7.37; F, 4.79. Found: C, 63.71; H, 7.18; F, 4.87.

9α - fluoro - $\Delta^4$ - pregnene - 11β,17α - diol - 3,20 - dione-21-ol hydrate possesses about ⅓ the activity of cortisone acetate in the rat liver glycogen assay and is about equal in activity to desoxycorticosterone in the sodium retention assay in the rat.

EXAMPLE 15

*9α - chloro - $\Delta^4$ - pregnene - 11β,17α - diol - 3,20- dione - 21 - al hydrate (XXV) from 9α - chloro- $\Delta^4$ - pregnene - 11β,17α - diol - 3,20 - dione - 21 - (p-dimethylaminophenyl)-nitrone (XXI)*

9α - chloro - $\Delta^4$ - pregnene - 11β,17α - diol - 3,20- dione 21-(p-dimethylaminophenyl)-nitrone is converted to 9α - chloro - $\Delta^4$ - pregnene - 11β,17α - diol - 3,20- dione-21-al hydrate as described in Example 14 for the corresponding fluoro compound.

The pure 9α - chloro - $\Delta^4$ pregnene - 11β,17α - diol- 3,20-dione-21-al hydrate, after recrystallization from dilute acetone, has the following properties: M.P. greater than 345° with darkening at 195°; $[\alpha]_D^{23}$ +132° (c, 0.35 in methanol);

$\lambda_{max}^{alc.}$ 240 mμ (ε=18,400); $\lambda_{max}^{Nujol}$ 2.92μ, 3.05-3.09μ (OH), 5.85μ (20-keto), 6.12μ (3-keto)

*Analysis.*—Calcd. for $C_{21}H_{27}O_5Cl \cdot H_2O$ (412.90): C, 61.08; H, 7.08; Cl, 8.59. Found: C, 61.43; H, 6.73; Cl, 8.66.

9α - chloro - $\Delta^4$ - pregnene - 11β,17α - diol - 3,20- dione-21-al hydrate shows about ⅓ the activity of cortisone acetate in the rat liver glycogen assay. It is about 3 times as active as desoxy-corticosterone in the sodium retention assay in the rat.

If 9α-fluoro-$\Delta^4$-pregnene-17α-ol-3,11,20-trione 21-(p-dimethylamino phenyl)-nitrone (XXII) is substituted for the 9α - fluoro - $\Delta^4$ - pregnene - 11β,17α - diol - 3,20- dione 21-(p-dimethylaminophenyl)-nitrone of Example 14, or if 9α-chloro-$\Delta_4$-pregnene-17α-ol-3,11,20-trione 21- (p-dimethylaminophenyl)-nitrone (XXIII) is substituted for the 9α-chloro-11β-hydroxy derivative of Example 15, then 9α -fluoro - $\Delta^4$ - pregnene - 17α - ol - 3,11,20- trione-21-al hydrate (XXVI) and 9α-chloro-$\Delta^4$-pregnene-17α-ol-3,11,20-trione-21-al hydrate (XXVII) are formed, respectively. Similarly, by substituting the 21-(p-dimethylaminophenyl)nitrone derivatives of 9α-fluoro (or chloro) - $\Delta^4$ - pregnene - 11β - ol - 3,20 - dione, or of 9α-fluoro (or chloro)-$\Delta^4$-pregnene-3,11,20-trione, or of 9α-fluoro (or chloro)-$\Delta^4$-pregnene-11β-ol-3,20-dione-18- al for the nitrone employed in Example 14, 9α-fluoro (or chloro) - $\Delta^4$ - pregnene - 11β - ol - 3,20 - dione- 21-al hydrate, and 9α-fluoro (or chloro)-$\Delta^4$-pregnene- 11β-ol-3,20-dione-18,21-diol 21-hydrate, respectively, are produced.

The 21-acetals can be produced directly from the nitrones as illustrated by the following Example:

EXAMPLE 16

*9α - fluoro - $\Delta^4$ - pregnene - 11β,17α - diol - 3,20 - dione 21 - al dimethyl-acetal (XXVIII) from 9α - fluoro- $\Delta^4$-pregene - 11β,17α - diol - 3,20 - dione - 12 - (p-dimethylaminophenyl)-nitrone (XX)*

To a suspension of 120 mg. of 9α-fluoro-$\Delta_4$-pregnene- 11β,17α - diol - 3,20 - dione - 21 - (p -dimethylaminophenyl)-nitrone in 2 ml. of acetone is added at room temperature 1 ml. of 2 N methanolic hydrogen chloride. The mixture is taken up in 20 ml. of chloroform and 4 ml. of water. After separation of the phases, the chloroform layer is extracted with dilute bicarbonate and water and after drying over sodium sulfate, is evaporated to dryness in vacuum. The residue represents the dimethyl acetal of 9α-fluoro-$\Delta_4$-pregnene-11β,18α-diol-3, 20-dione-21-al.

Similarly, by substituting 9α-chloro-$\Delta^4$-pregnene-11β, 17α - diol - 3,20 - dione - 21 - (p - dimethylaminophenyl)- nitrone (XXI), 9α - fluoro - $\Delta^4$ - pregnene - 17α - ol, 3,11,20 - trione - 21 - (p - dimethylaminophenyl) -nitrone (XXII), or 9α - chloro - $\Delta^4$ - pregnene - 17α - ol - 3,11, 20 trione-21-(p-dimethyl-aminophenyl)-nitrone (XXIII) for the nitrone of Example 16, the respective 21-dimethyl acetals, XXIX, XXX, and XXXI, are produced. Furthermore, if 1% ethanolic hydrogen chloride is substituted for the methanolic hydrogen chloride in the procedure of Example 16, the corresponding diethyl acetals are formed.

The invention may be variously otherwise embodied within the scope of the appended claims.

We claim:

1. A process for preparing a steroid of the general formula

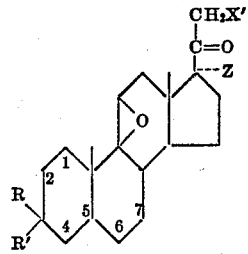

wherein at least one of the positions 1,2; 4,5; and 6,7 is double-bonded and R is hydrogen, R' is hydroxy and together R and R' is selected from the group consisting of keto and ketalized keto, Z is selected from the group consisting of hydrogen and $\alpha$-hydroxy, and X' is selected from the group consisting of bromo and chloro, which comprises treating a steroid of the general formula

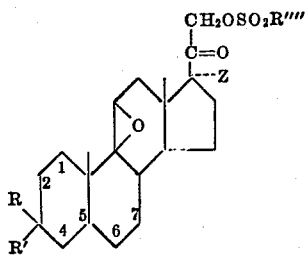

wherein at least one of the positions 1,2; 4,5; and 6,7 is double-bonded, R'''' is alkyl, and R, R' and Z are as above-defined with a salt selected from the group consisting of light metal bromides and light metal chlorides under substantially anhydrous conditions in a neutral organic solvent for the salt, and recovering the resultant steroid.

2. A process for preparing a steroid of the general formula

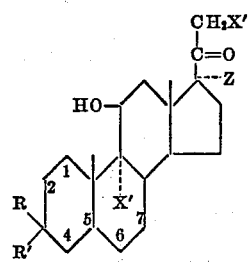

wherein at least one of the positions 1,2; 4,5; and 6,7 is double-bonded, and R is hydrogen, R' is hydroxy and together R and R' is selected from the group consisting of keto and ketalized keto, Z is selected from the group consisting of hydrogen and $\alpha$-hydroxy, and X' is selected from the group consisting of bromo and chloro, which comprises treating a steroid of the general formula

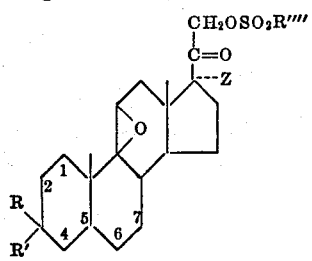

wherein at least one of the positions 1,2; 4,5; and 6,7 is double-bonded, R'''' is alkyl, and R, R', and Z are as above-defined with a salt selected from the group consisting of light metal bromide and light metal chloride in an acid organic solvent for said salt.

References Cited in the file of this patent

UNITED STATES PATENTS

| | | |
|---|---|---|
| 2,268,084 | Reichstein | Dec. 30, 1941 |
| 2,664,428 | Miescher et al. | Dec. 29, 1953 |
| 2,665,274 | Conbere | Jan. 5, 1954 |
| 2,842,568 | Fried et al. | July 8, 1958 |
| 2,851,455 | Fried et al. | Sept. 9, 1958 |
| 2,903,449 | Fried et al. | Sept. 8, 1959 |